Sept. 18, 1951 J. G. PRENTISS 2,568,167

VIBRATION-DAMPING-ELECTROMAGNETIC COUPLING UNIT FOR SOUND AMPLIFYING APPARATUS

Filed Feb. 28, 1946

JOHN G. PRENTISS
INVENTOR.

BY
HIS ATTORNEYS

Patented Sept. 18, 1951 2,568,167

UNITED STATES PATENT OFFICE 2,568,167

VIBRATION-DAMPING ELECTROMAGNETIC COUPLING UNIT FOR SOUND-AMPLIFYING APPARATUS

John G. Prentiss, Berwyn, Ill., assignor to Zenith Radio Corporation, a corporation of Illinois Application February 28, 1946, Serial No. 650,989

1 Claim. (Cl. 175—356)

This invention relates to improvements in amplifying apparatus and more particularly to compact alternating current amplifiers of vibrations.

A principal object of this invention is to provide a high gain vibration amplifier unit free from objectionable feedback and providing highly stable amplification.

A specific object of this invention is to provide an extremely high gain hearing aid free from objectionable acousto-mechanical feedback.

A further object of this invention is to provide a potted audio reactor or transformer assembly in which core vibrations are confined within the core of the device.

The features of the present invention which are believed to be novel are set forth with particularity in the appended claim. The present invention itself, both as to its organization and manner of operation, together with further objects and advantages thereof, may best be understood by reference to the following description taken in connection with the accompanying drawings, in which:

Figures 1, 2, 3:
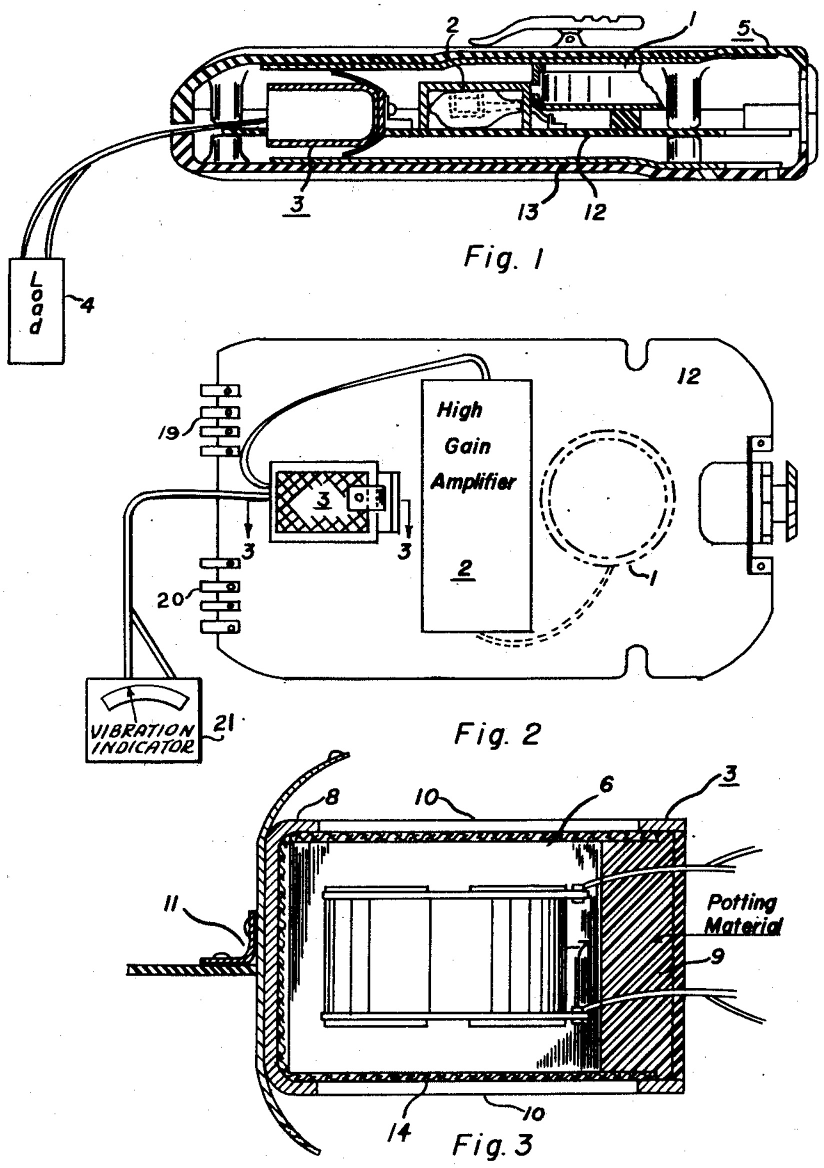
Figure 1 is a vertical section view through a device embodying the invention.
Figure 2 is a plan view of certain parts of the device of Figure 1 and shows also a specialized form of the load of Figure 1.
Figure 3 is a view, partly in section, taken in the plane of line 3—3 in Figure 2, of a part of the device of Figures 1 and 2.

In Figure 1, mechano-electrical transducer 1 picks up vibrations and converts them to electrical impulses which are amplified by a very high gain amplifier 2 and impressed on load 4 through coupler 3. All of the aforementioned elements except load 4 are mounted substantially rigidly within a framework 5, although it is not essential to this invention that amplifier 2 be on a common framework with mechano-electrical transducer 1 and coupler 3.

Mechano-electrical transducer 1 may be of any desired type so long as it is capable of converting mechanical or sound vibrations to electrical impulses.

Amplifier 2 includes one or more vacuum tubes and has at least one stage of high gain.

In one particular embodiment of this invention, which was a hearing aid, the voltage gain, given purely by way of example, was in the order of 15,000 from the output of transducer 1 to the input of coupler 3. In this device serious instability was produced by mechanical feedback from coupler 3 to transducer 1, which was entirely cured by incorporating this invention in the hearing aid. It should be noted that such difficulties may arise not only because of high voltage gain but also when large power gain is realized within the unit.

In this same particular embodiment load 4 was electrically connected to coupler 3 through terminals 19, and operating voltages were connected to amplifier 2 through power terminals 20.

Load 4 may be any desired type of device responsive to alternating voltages and may, for example, be an indicator, electro-acoustical transducer, or another vacuum tube amplifier. In the most common applications it is some form of electro-acoustical transducer. The basic concept involved in the present invention does not involve the characteristics of load 4.

Coupler 3 may be an audio reactor or transformer depending on whether load 4 is inductively coupled or transformer coupled to amplifier 2. As its name implies coupler 3 forms the electrical link between amplifier 2 and load 4 and its exact electrical characteristics must be determined from the electrical characteristics of amplifier 2 and load 4.

Framework 5, to which mechano-electrical transducer 1 and coupler 3 are attached and to which amplifier 2 is usually attached, comprises case 13 and chassis 12 supported therein.

Because transducer 1, amplifier 2, and coupler 3 are mounted on and supported by framework 5, vibration of any of the elements is transmitted with relatively low attenuation through framework 5 to transducer 1. If the vibration is in a direction which is parallel to the direction of sensitivity of the mechano-electrical transducer, regenerative feedback through the electro-mechanical loop consisting of the vibrating element, framework 5, transducer 1, and amplifier 2, results, and the device incorporating these elements operates with seriously impaired performance.

The element most likely to transmit vibrations to framework 5, and hence to cause oscillations, is the electromagnetic coupler 3.

Figure 3 is, in part, a sectional view of a particular electromagnetic coupler 3. In that figure, coupler 3 includes a ferromagnetic core 6, at least one winding 7 thereon, a container or enclosure 8, potting material 9, fabric 14, openings 10, and mount 11.

The nature of the potting material 9 is such that it imparts moisture-proof characteristics to the assembly. Purely by way of example, this potting material may be bees-wax.

The vibration of core 6 in coupler 3 is associated with variations in flux density as the alternating voltage impressed on coupler 3 passes through its cyclic variations. A relatively strong vibration of core 6 occurs at the frequency of the vibrations picked up by transducer 1. These core vibrations when transmitted to transducer 1, have a component parallel to the direction of sensitivity of transducer 1. Ordinarily these core vibrations would be transmitted with little attenuation from core 6 to the tight fitting container 8, and subsequently through chassis 12 and case 13 to transducer 1, and from transducer 1 through amplifier 2 back to coupler 3, so that oscillation of the circuit occurs. By providing openings 10 in container 8 adjacent core 6, the amplitude of the vibrations transmitted to container 8 from core 6 is greatly attenuated and, consequently, the amplitude of the vibrations transmitted to framework 5 and, hence, to transducer 1 is correspondingly reduced.

The attenuation of such vibration is associated with the mismatch of mechanical impedances effected by cutting away the container over a region in close proximity to the core.

The coupler core 6 is a high impedance source of mechanical vibration. The walls of container 8 also have a high characteristic mechanical impedance. Thus, when there is close contact between core 6 and the walls of container 8, as is necessary in a compact device of this type, there occurs an efficient transfer of vibratory energy from core 6 to the walls of container 8. By the provision of openings 10, the vibrations can only pass to container 8 through an unconfined region of fabric 14. This medium (fabric 14) has an extremely low mechanical impedance as well as a high mechanical attenuation. Very little energy is transferred from core 6 to fabric 14 because of this impedance mismatch, and that which is transferred is severely attenuated before it reaches container 8. As a result, objectionable mechanical feedback from core 6 of coupler 3 to mechano-electrical transducer 1 through framework 5 is substantially eliminated.

Fabric 14 is impregnated with potting material 9 during the assembly of coupler 3 so that the assembly retains its humidity-proofed characteristics despite the existence of openings 10 provided in the walls of container 8. Thus, the desirable effect of reducing the amount of core vibrations appearing at mount 11 is realized without sacrificing the desired moisture-proofing of coupler 3.

The openings 10 need not be of a particular configuration so long as container 8 is open in the regions of maximum vibration of core 6. In the particular structure of Figure 3, these regions lie juxtaposed to the ends of that cross arm of core 6 which carries windings 7. The greater the size of openings 10 relative to the size of the region of maximum vibration, the greater the elimination of core vibration appearing at mount 11, and the less probable is objectionable feedback.

Figure 4:
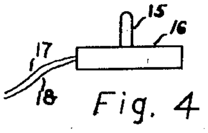
Figure 4 illustrates an alternative form of a part of the device shown in Figures 1 and 2.

Figure 4 shows an alternative form of mechano-electrical transducer adapted to the pick-up and amplification of mechanical vibrations.

In Figure 4, pin 15 is attached to transducer assembly 16. When pin 15 is placed in contact with any vibrating surface transducer assembly 16 produces a voltage between wires 17 and 18 which lead to amplifier 2.

This invention is particularly adapted for use in compact devices such as hearing aids and portable vibration meters, where coupler 3 and mechano-electrical transducer 1 are necessarily in close proximity to each other and the attenuation of vibrations between the vibrating element and the vibration sensitive element is slight.

While a particular embodiment of the present invention has been shown and described, it will be obvious to those skilled in the art that changes and modifications may be made without departing from this invention in its broader aspects, and, therefore, the aim in the appended claim is to cover all such changes and modifications.

I claim:

A moisture-proof electromagnetic coupling unit including a magnetic structure having a core portions of which are subject to maximum mechanical vibration when said coupling unit is energized by wave signals, at least one winding on said core for energization by wave signals, a cointainer fitting relatively tightly about said magnetic structure, fabric about said magnetic structure and within said container, potting material within said container surrounding said magnetic structure and impregnating said fabric, and a mount associated with said container, said container being provided with openings of approximately the same area as and overlying said portions of said core subject to maximum mechanical vibration.

JOHN G. PRENTISS.

REFERENCES CITED

The following references are of record in the file of this patent:

UNITED STATES PATENTS

| Number | Name | Date |
|---|---|---|
| 1,284,267 | Eaton | Nov. 12, 1918 |
| 1,688,891 | Spreen | Oct. 23, 1928 |
| 1,702,159 | Grunow | Feb. 12, 1929 |
| 1,788,627 | Meyerhans | Jan. 13, 1931 |
| 1,863,043 | Johnson | June 14, 1932 |
| 1,974,588 | Snell | Sept. 25, 1934 |
| 2,068,522 | Thordarson | Jan. 19, 1937 |
| 2,149,529 | La Fave | Mar. 7, 1939 |
| 2,321,370 | Dubilier | June 8, 1943 |
| 2,327,321 | Shapiro | Aug. 17, 1943 |
| 2,336,828 | Zarth | Dec. 14, 1943 |